(12) United States Patent
Du et al.

(10) Patent No.: US 10,123,024 B2
(45) Date of Patent: Nov. 6, 2018

(54) IMAGE PROCESSING METHODS AND IMAGE PROCESSING APPARATUSES

(71) Applicant: Beijing Zhigu Rui Tuo Tech Co., Ltd, Beijing (CN)

(72) Inventors: Lin Du, Beijing (CN); Dayong Ding, Beijing (CN)

(73) Assignee: BEIJING ZHIGU RUI TUO TECH CO., LTD, Beijing (CN)

(*) Notice: Subject to any disclaimer, the term of this patent is extended or adjusted under 35 U.S.C. 154(b) by 18 days.

(21) Appl. No.: 15/304,514

(22) PCT Filed: Mar. 12, 2015

(86) PCT No.: PCT/CN2015/074066
§ 371 (c)(1),
(2) Date: Oct. 15, 2016

(87) PCT Pub. No.: WO2015/158190
PCT Pub. Date: Oct. 22, 2015

(65) Prior Publication Data
US 2017/0041620 A1    Feb. 9, 2017

(30) Foreign Application Priority Data
Apr. 18, 2014   (CN) .......................... 2014 1 0156523

(51) Int. Cl.
*H04N 19/17* (2014.01)
*H04N 19/132* (2014.01)
(Continued)

(52) U.S. Cl.
CPC ........... *H04N 19/17* (2014.11); *H04N 19/132* (2014.11); *H04N 19/162* (2014.11); *H04N 19/167* (2014.11); *H04N 19/59* (2014.11)

(58) Field of Classification Search
CPC .. H04N 19/132; H04N 19/162; H04N 19/167; H04N 19/59; H04N 19/169;
(Continued)

(56) References Cited

U.S. PATENT DOCUMENTS

| 4,572,616 A | 2/1986 | Kowel et al. |
| 7,336,833 B2 | 2/2008 | Horn |

(Continued)

FOREIGN PATENT DOCUMENTS

| CN | 101102495 A | 1/2008 |
| CN | 101501726 A | 8/2009 |

(Continued)

OTHER PUBLICATIONS

Chinese Office Action dated Oct. 11, 2017 for Chinese Patent Application No. 201410156523.5, 7 pages.
(Continued)

Primary Examiner — Michael Osinski
(74) Attorney, Agent, or Firm — Amin, Turocy & Watson, LLP

(57) ABSTRACT

Image processing methods and image processing apparatuses are provided. The image processing method comprises: determining at least one region of interest in an image; determining a parameter of interest of pixels in the image at least according to distribution of the at least one region of interest in the image; determining target positions of the pixels according to the parameter of interest of the pixels and a reduction ratio; and obtaining, according to the target positions of the pixels, a reduced image corresponding to the image. A proportion occupied by pixels of each region in a reduced image after compression is determined according to a degree of interest of a user in each region in an image, to cause a region appreciated by the user to be
(Continued)

presented with high quality during restoration, and facilitate image processing after compression.

33 Claims, 11 Drawing Sheets

(51) Int. Cl.
*H04N 19/162* (2014.01)
*H04N 19/167* (2014.01)
*H04N 19/59* (2014.01)

(58) Field of Classification Search
CPC ...... H04N 19/00; H04N 19/10; H04N 19/105; H04N 19/61; H04N 19/17; G06T 2207/10016; G06T 2207/20221; G06T 3/00; G06T 3/0012; G06T 3/4007; G06T 3/4076; G06T 5/00–5/50; G06T 9/00–9/008; G06K 9/00771; G06K 9/6203; G06K 9/00228; G06K 9/00268; G06K 9/00288; G06K 9/4609; G06K 9/4671

See application file for complete search history.

(56) References Cited

U.S. PATENT DOCUMENTS

| | | | |
|---|---|---|---|
| 8,526,685 B2 | 9/2013 | Jang | |
| 8,571,353 B2 | 10/2013 | Watanabe | |
| 9,355,434 B2* | 5/2016 | Dupret | G06T 3/4053 |
| 9,444,970 B2 | 9/2016 | Jones et al. | |
| 9,667,841 B2* | 5/2017 | Kawai | H04N 5/145 |
| 9,716,837 B2* | 7/2017 | Wu | H04N 5/23296 |
| 9,767,072 B2* | 9/2017 | Thust | G06F 17/10 |
| 2003/0006995 A1 | 1/2003 | Smith et al. | |
| 2005/0238198 A1* | 10/2005 | Brown | G06K 9/4609 |
| | | | 382/103 |
| 2007/0081729 A1* | 4/2007 | Ogawa | G06F 17/30277 |
| | | | 382/209 |
| 2007/0211207 A1 | 9/2007 | Lo et al. | |
| 2007/0229665 A1* | 10/2007 | Tobiason | H04N 5/3572 |
| | | | 348/187 |
| 2007/0292019 A1* | 12/2007 | Terakawa | G06K 9/00248 |
| | | | 382/159 |
| 2009/0060290 A1* | 3/2009 | Sabe | G06K 9/00248 |
| | | | 382/118 |
| 2009/0097557 A1* | 4/2009 | Takahashi | H04N 19/593 |
| | | | 375/240.12 |
| 2010/0183193 A1* | 7/2010 | Sugisawa | G06T 3/40 |
| | | | 382/103 |
| 2010/0232712 A1* | 9/2010 | Tomita | G06K 9/00228 |
| | | | 382/209 |
| 2010/0265353 A1 | 10/2010 | Koyama et al. | |
| 2011/0051808 A1* | 3/2011 | Quast | H04N 7/18 |
| | | | 375/240.08 |
| 2011/0135151 A1 | 6/2011 | Ping Ouyang et al. | |
| 2011/0188758 A1* | 8/2011 | Kinoshita | G06T 7/11 |
| | | | 382/195 |
| 2012/0014453 A1* | 1/2012 | Kawai | H04N 5/145 |
| | | | 375/240.16 |
| 2012/0027319 A1* | 2/2012 | Hu | H04N 1/409 |
| | | | 382/275 |
| 2012/0057798 A1* | 3/2012 | Saito | G06T 11/001 |
| | | | 382/218 |
| 2012/0176471 A1* | 7/2012 | Cheng | H04N 13/0264 |
| | | | 348/43 |
| 2012/0275718 A1 | 11/2012 | Takamori et al. | |
| 2013/0027581 A1 | 1/2013 | Price et al. | |
| 2013/0051680 A1* | 2/2013 | Kono | G06T 7/0081 |
| | | | 382/195 |
| 2015/0138380 A1* | 5/2015 | Tsubaki | H04N 5/144 |
| | | | 348/208.1 |
| 2015/0187083 A1* | 7/2015 | Yoon | H04N 5/23212 |
| | | | 382/106 |
| 2016/0286235 A1* | 9/2016 | Yamamoto | H04N 19/70 |
| 2017/0195680 A1* | 7/2017 | Yamamoto | H04N 19/39 |

FOREIGN PATENT DOCUMENTS

| | | |
|---|---|---|
| CN | 101561316 A | 10/2009 |
| CN | 101867723 A | 10/2010 |
| CN | 101894361 A | 11/2010 |
| CN | 102111601 A | 6/2011 |
| CN | 102375992 A | 3/2012 |
| CN | 102905136 A | 1/2013 |
| CN | 103260081 A | 8/2013 |
| CN | 103530845 A | 1/2014 |
| CN | 103575264 A | 2/2014 |
| CN | 103617599 A | 3/2014 |
| CN | 103647923 A | 3/2014 |
| CN | 103927767 A | 7/2014 |
| JP | 2013125519 A | 6/2013 |
| WO | 2006003647 A2 | 1/2006 |

OTHER PUBLICATIONS

International Search Report for PCT Application No. PCT/CN2015/074066, dated Jun. 15, 2015, 4 pages.

Xu, Ping. "Design and Implement of a Compression Algorithm for Image Region of Interest Based on JPEG" Master's Degree Thesis, Huazhong University of Science and Technology. Jan. 2011. 56 pages.

* cited by examiner

IMAGE PROCESSING METHODS AND IMAGE PROCESSING APPARATUSES

RELATED APPLICATION

The present application is a U.S. National Stage filing under 35 U.S.C. § 371 of international patent cooperation treaty (PCT) application No. PCT/CN2015/074066, filed Mar. 12, 2015, and entitled "IMAGE PROCESSING METHODS AND IMAGE PROCESSING APPARATUSES", which claims the benefit of priority to Chinese Patent Application No. 201410156523.5, filed on Apr. 18, 2014, and entitled "Image Processing Method and Image Processing Apparatus", which applications are hereby incorporated into the present application by reference herein in their respective entireties.

TECHNICAL FIELD

This application relates to image processing technologies, and in particular, to image processing methods and image processing apparatuses.

BACKGROUND

With constant development of image collection technologies, more and more devices for image collection emerge, the quality of collected images becomes increasingly high, and the size of images also increases accordingly. For example, the size of a photo photographed by a single lens reflex camera may be dozens of megabytes. This brings much pressure to image storage and transmission.

SUMMARY

An example, non-limiting objective of this application is to provide an image processing technology.

According to a first example aspect, this application provides an image compression method, comprising:

determining at least one region of interest in an image;

determining a parameter of interest of pixels in the image at least according to distribution of the at least one region of interest in the image;

determining target positions of the pixels according to the parameter of interest of the pixels and a reduction ratio; and obtaining, according to the target positions of the pixels, a reduced image corresponding to the image.

According to a second example aspect, this application provides an image restoration method, comprising:

obtaining a reduced image corresponding to an original image and at least one interest related parameter of pixels in the reduced image;

determining target positions of the pixels according to the at least one interest related parameter of the pixels and an enlargement ratio; and obtaining, according to the target positions of the pixels, a restored image corresponding to the original image.

According to a third example aspect, this application provides an image compression apparatus, comprising:

a region of interest determining module, configured to determine at least one region of interest in an image;

a parameter determining module, configured to determine a parameter of interest of pixels in the image at least according to distribution of the at least one region of interest in the image;

a target position determining module, configured to determine target positions of the pixels according to the parameter of interest of the pixels and a reduction ratio; and a reduced image obtaining module, configured to obtain, according to the target positions of the pixels, a reduced image corresponding to the image.

According to a fourth example aspect, this application provides an image restoration apparatus, comprising:

an obtaining module, configured to obtain a reduced image corresponding to an original image and at least one interest related parameter of pixels in the reduced image;

a target position determining module, configured to determine target positions of the pixels according to the at least one interest related parameter of the pixels and an enlargement ratio; and a restored image obtaining module, configured to obtain, according to the target positions of the pixels, a restored image corresponding to the original image.

In at least one embodiment of this application, an image is compressed according to distribution of at least one region in which a user is interested in the image, and a proportion occupied by pixels of each region in a reduced image after compression is determined according to a degree of interest of the user in each region in the image. In this way, information about pixels of a region that needs to be presented for the user with high quality is more stored in the reduced image, and information about pixels of a region that the user expects to vaguely present is less stored in the reduced image.

In addition, in at least one embodiment of this application, pixel information of the region in which the user is interested and pixel information of other region(s) in the image are discriminately presented in the same reduced image, which facilitates subsequent processing of the reduced image by the user.

In the at least one embodiment of this application, the reduced image is restored, and the region of interest and the other region(s) in a restored image are restored and presented with different quality according to a presentation requirement of the user.

DETAILED DESCRIPTION

Various embodiments of this application are further described in detail with reference to the accompanying drawings (a same element is marked by a same number in the accompanying drawings) and embodiments. The following embodiments are intended to describe this application, but not intended to limit the scope of this application.

A person skilled in the art may understand that, the terms such as "first" and "second" in this application are merely used to distinguish different steps, devices, modules, or the like, which do not represent any specific technical meanings, nor indicate a certain logical order between them.

Figure 1:
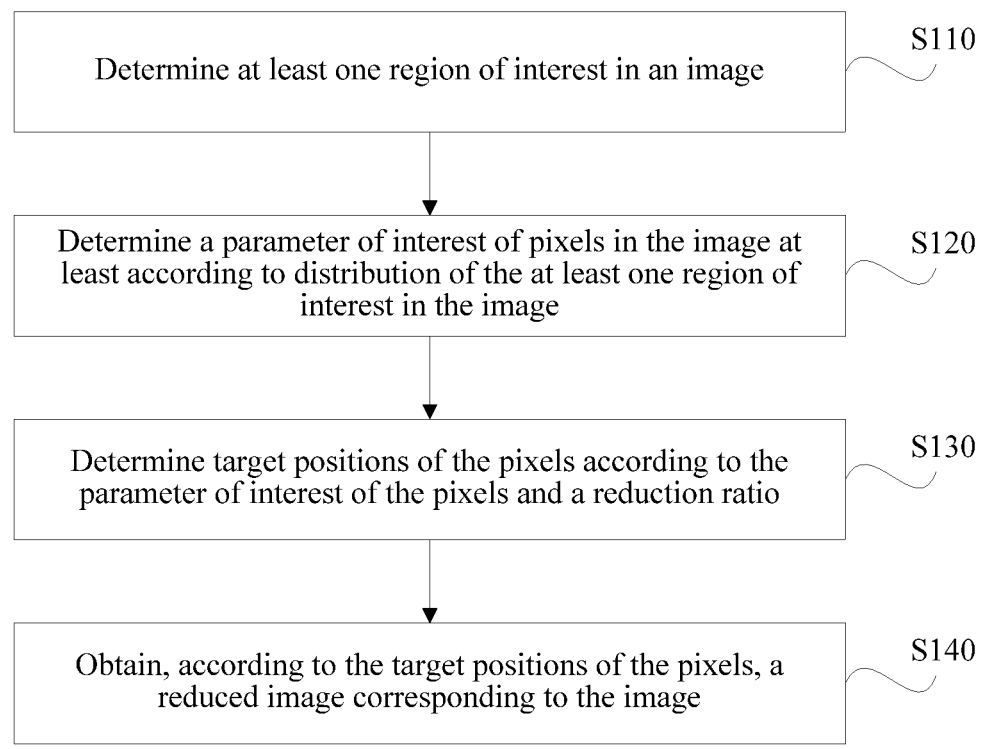
FIG. 1 is an example flowchart of steps of an image compression method according to an embodiment of this application.

During image transmission or storage, an original image generally needs to be compressed, to reduce the size of the image. For a region of interest (for example, a face region in a portrait) that a user expects to present with high quality, it is expected that original information of pixels of the at least one region of interest is retained as much as possible during compression; for a region of interest (for example, the face of a person in a street view image or the license plate number of a car in a traffic image), pixel quality of the region does not need to be considered much during compression. Therefore, as shown in FIG. 1, an embodiment of this application provides an image compression method, comprising:

S110: Determine at least one region of interest in an image.

S120: Determine a parameter of interest of pixels in the image at least according to distribution of the at least one region of interest in the image.

S130: Determine target positions of the pixels according to the parameter of interest of the pixels and a reduction ratio.

S140: Obtain, according to the target positions of the pixels, a reduced image corresponding to the image.

In this embodiment of this application, the at least one region of interest is at least one region to which a user pays attention. In an example embodiment, the at least one region of interest can comprise at least one region that the user expects to present with high quality. In another example embodiment, the region of interest can comprise at least one region that the user expects to vaguely present.

The image may have one region of interest like said above, or have multiple regions of interest like said above.

In this embodiment of this application, the parameter of interest of a pixel indicates an importance degree of the pixel in the image. For example, the larger the value of the parameter of interest of a pixel is, the more important the pixel is in the image, and the pixel is more required to be presented with high quality. In the following implementation of this application, the larger the value of the parameter of interest of a pixel is, the more information about the pixel may be stored in the reduced image.

In this embodiment of this application, an image is compressed according to distribution of the region(s) in which a user is interested in the image, and a proportion occupied by pixels of each region in a reduced image after compression is determined according to a degree of interest of the user in each region in the image.

The steps in this embodiment of this application are further described by using the following example embodiments.

S110: Determine at least one region of interest in an image.

In this example embodiment, description is made by using an example in which the at least one region of interest is at least one region that a user expects to present with high quality. In addition, in an embodiment shown in FIG. 3a to FIG. 3c, an example is further provided that the at least one region of interest comprises at least one region that a user expects to vaguely present.

In this embodiment of this application, the at least one region of interest may be determined according to a default setting.

For example, in an example embodiment, when the attribute of the image is a portrait, it is determined, according to a default setting, that a region corresponding to the face of a person in the image is a region of interest (wherein the region corresponding to the face of the person in the image may be determined by using a commonly used technology of recognizing a face in an image, which is not elaborated herein). Alternatively, in another example embodiment, the at least one region of interest may be determined by using a collection parameter used when an image collection device obtains an image, for example, the at least one region of interest in the image is determined according to a position of a focusing frame during image collection.

Certainly, in an example embodiment, the at least one region of interest may also be determined according to a user instruction.

S120: Determine a parameter of interest of pixels in the image at least according to distribution of the at least one region of interest in the image.

In this embodiment of this application, step S120 comprises: determining the parameter of interest of the pixels according to the distribution of the at least one region of interest in the image and distribution information of the pixels in the image.

In an example embodiment of this embodiment of this application, the distribution information of the pixels in the image comprises:

first position information of the pixels relative to the at least one region of interest.

In another example embodiment of this embodiment of this application, the distribution information of the pixels in the image comprises:

second position information of the pixels relative to the boundary of the image.

In another example embodiment of this embodiment of this application, the distribution information of the pixels in the image comprises: the first position information and the second position information.

Figure 2A:
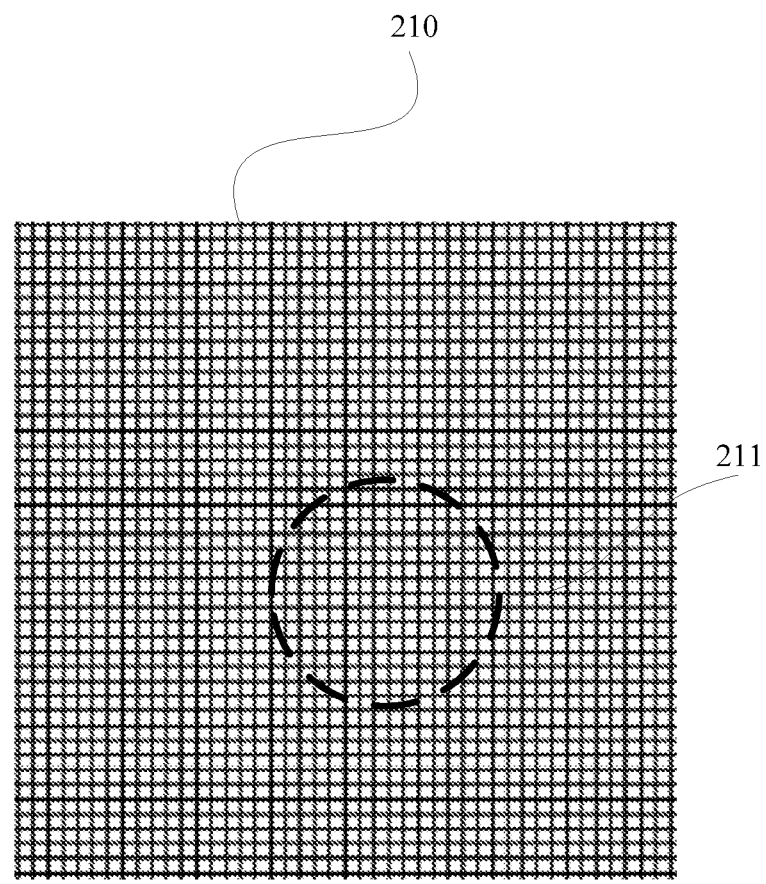
FIG. 2a to FIG. 2c are example schematic diagrams of compressing an image by using an image compression method according to an embodiment of this application.
Figure 2B:
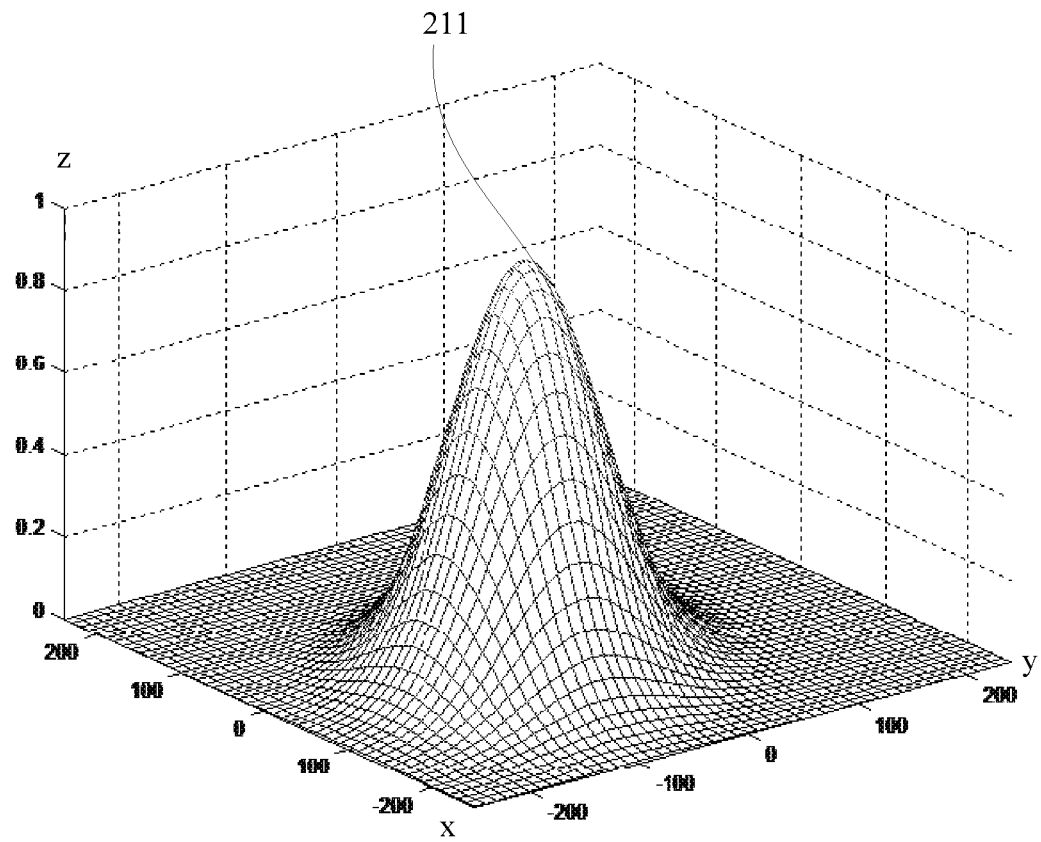

In an example embodiment, the parameter of interest of the pixels are spatially smoothly distributed. For example, it is assumed that at least one pixel in the center of a region of interest has a largest parameter of interest (here the largest parameter of interest means the value of the parameter is the largest), and smooth transition of the parameter of interest occurs from the at least one pixel to a region of non-interest around, as shown in FIG. 2a and FIG. 2b. In an image shown in FIG. 2a, the parameter of interest of pixels are distributed as shown in FIG. 2b, wherein among the parameter of interest of the pixels in the image, the largest one is 1, and the smallest one is 0.

In another example embodiment, the parameter of interest of the pixels are distributed according to regions, for example, the parameter of interest of pixels in the at least one region of interest is 1, and the parameter of interest of pixels in other region(s) is 0. In this case, smooth processing may be performed on the parameter of interest of the pixels in the other region(s), to implement smooth transformation from the at least one region of interest to the other region(s).

In an example embodiment, the parameter of interest of the pixels may be determined according to distances from the pixels to the at least one region of interest. For example, a pixel closer to the at least one region of interest has a larger parameter of interest.

S130: Determine target positions of the pixels according to the parameter of interest of the pixels and a reduction ratio.

In an example embodiment of this application, step S130 comprises:

obtaining a first change trend parameter of the parameter of interest of the pixels according to the parameter of interest of the pixels; and determining a first movement direction and a first movement amplitude of the pixels according to the first change trend parameter of the parameter of interest of the pixels.

In this example embodiment, step S130 further comprises:

determining a second movement direction and a second movement amplitude of the pixels according to the reduction ratio.

A movement direction and a movement amplitude of the pixels can be determined according to the first movement direction, the first movement amplitude, the second movement direction, and the second movement amplitude of the pixels, thereby determining the target positions of the pixels.

In an example embodiment, to ensure the image quality of the at least one region of interest, in step S130, pixels in the at least one region of interest may be not moved, and pixels of other region(s) are moved towards the at least one region of interest.

In this embodiment of this application, the reduction ratio can be a ratio of the image to the reduced image.

In an example embodiment, the reduction ratio is a constant set value.

In another example embodiment, the reduction ratio is dynamic, for example, is determined according to a proportion of the at least one region of interest in the image. For example, when the proportion occupied by the at least one region of interest is within a set first threshold range, the reduction ratio is set to a first value; when the proportion occupied by the at least one region of interest is within a set second threshold range, the reduction ratio is set to a second value. Generally, to ensure the pixel density of the at least one region of interest, the larger the proportion occupied by the at least one region of interest is, the smaller the reduction ratio is.

Therefore, in an example embodiment of this embodiment of this application, the method further comprises:

determining the reduction ratio.

The determining the reduction ratio comprises:

determining the reduction ratio according to the distribution of the at least one region of interest in the image.

In another example embodiment, when the reduced image is to be transmitted, the reduction ratio may also be determined according to bandwidth of a transport network. For example, when the bandwidth is desirable, the corresponding reduction ratio is small; when the bandwidth is narrow, the corresponding reduction ratio is large, to cause the corresponding reduced image to occupy less network resources.

S140: Obtain, according to the target positions of the pixels, a reduced image corresponding to the image.

In this embodiment of this application, because the reduced image is an image obtained by reducing and transforming the image, it can be known that target positions of multiple pixels in the image may overlap. Therefore, in this embodiment of this application, step S140 comprises:

merging, by performing down sampling processing, at least two pixels that have the same target position in the image.

The merging at least two pixels can be:

determining, according to average values of pixel values and the parameter of interest of the at least two pixels, a pixel value and a value of parameter of interest of a pixel corresponding to the target position; or the merging at least two pixels can be:

determining a pixel at the target position according to weighted average values of pixel values and the parameter of interest of other pixels around the target position; or the merging at least two pixels can be:

using one pixel of the at least two pixels as a pixel at the target position.

In this embodiment of this application, a pixel having a larger parameter of interest is more important, and therefore, in step S140, the at least two pixels may be merged according to the parameter of interest of the at least two pixels.

Further, in an example embodiment, corresponding to that there is a pixel in the at least two pixels that has a parameter of interest larger than a parameter of interest of other pixel(s) in the at least two pixels, the pixel having a larger parameter of interest is used as a pixel after merging. That is, the pixel having a larger parameter of interest is used as a pixel at the target position. By performing this step, a pixel having a larger parameter of interest is more likely to be retained.

In an example embodiment of this embodiment of this application, the method further comprises:

Obtaining the parameter of interest of pixels in the reduced image.

The parameter of interest of the pixels in the reduced image are basis for image restoration, and therefore, the reduced image can be restored more accurately by obtaining the parameter of interest of the pixels in the reduced image.

In this embodiment of this application, the method further comprises:

Storing, or outputting, or storing and outputting the parameter of interest of the pixels in the reduced image.

In an example embodiment of this embodiment of this application, the method further comprises:

obtaining a change trend parameter of the parameter of interest of the pixels in the reduced image according to the parameter of interest of the pixels in the reduced image.

When the reduced image is restored, attention is paid to a change trend of the parameter of interest. Therefore, in an example embodiment, during restoration, only the change trend parameter of the reduced image is required rather than the parameter of interest of the pixels in the reduced image.

In this example embodiment, the method further comprises:

storing, or outputting, or storing and outputting the change trend parameter of the parameter of interest of the pixels in the reduced image.

In this embodiment of this application, the method further comprises:

storing, or outputting, or storing and outputting the reduced image.

This embodiment of this application is described below by using an example embodiment corresponding to FIG. 2a to FIG. 2c and an example embodiment corresponding to FIG. 3a to FIG. 3c as examples.

Figure 2C:
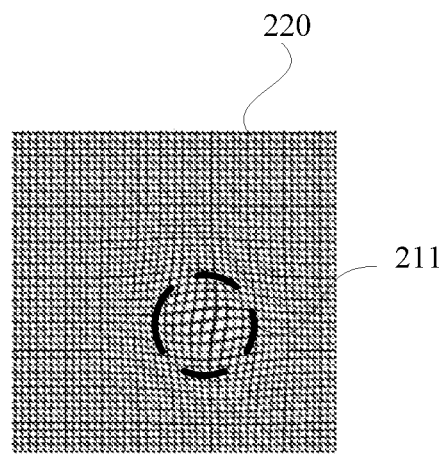

As shown in FIG. 2a to FIG. 2c, in an example embodiment of this embodiment of this application, an image 210 is shown in FIG. 2a, and the image 210 comprises a region of interest 211. In this embodiment of this application, the region of interest 211 is a region that needs to be presented with high quality.

A parameter of interest of pixels in the image 210 are determined according to distribution of the region of interest 211 in the image 210 and distribution information of the pixels in the image 210, which are shown in FIG. 2b, wherein the x and y axes are coordinate axes of a two-dimensional coordinate system of a plane in which the image 210 is located, and the z axis indicates the parameter of interest. As can be seen from FIG. 2b, in this example embodiment, a parameter of interest of a pixel corresponding to the region of interest 211 is the largest, a parameter of interest of a pixel far away from the region of interest 211 is the smallest, and smooth large-to-small transition of the parameter of interest occurs from a pixel close to the region of interest 211 to one far away from the region of interest 211. In addition, to ensure the shape of the image 210, in this example embodiment of this application, the parameter of interest of pixels corresponding to regions close to the boundary of the image 210 are the same (a first change trend parameter of these pixels is 0).

In this example embodiment, the first change trend parameter of a pixel in the image 210 is a gradient of the parameter of interest of a point corresponding to the pixel, that means, partial differentials of the parameter of interest of the point in x and y directions, which may be indicated by the following formula:

$$\nabla R = \left(\frac{\partial R}{\partial x}, \frac{\partial R}{\partial y}\right)$$

wherein x, y are coordinates of the point, R is a parameter of interest of the point, and therefore, a gradient value of the point is a two-dimensional vector.

In this example embodiment of this application, the pixels are moved in a direction opposite to the gradient. For example, if the parameter of interest of the pixels in the region of interest 211 forms a peak with an inward gradient, the pixels in the region of interest 211 trends to be moved outward, wherein a movement amplitude of the pixels is decided by an absolute value of the gradient related to the pixels. That is, a first movement direction and a first movement amplitude of the pixels can be determined according to the gradient of the parameter of interest of the points corresponding to the pixels in the image 210.

In this example embodiment, the reduction ratio can be a ratio of the area of a reduced image to, and in this example embodiment, the reduction ratio is 1:4.

The image 210 needs to be contracted to ¼ of the current area according to the reduction ratio, and therefore, for the pixels in the image 210, a second movement direction and a second movement amplitude of the pixels can be further determined according to the reduction ratio.

In this embodiment of this application, as an example, the pixels of the image 210 are contracted towards the center of the image 210. In another example embodiment of this application, the contraction may also be performed by setting another reference point.

In conclusion, target positions of the pixels in the image 210 can be determined according to the first and second movement directions and the first and second movement amplitudes.

For multiple pixels whose target positions overlap, up sampling is performed by using the up sampling method, to obtain a reduced image 220 shown in FIG. 2c.

As can be seen from FIG. 2c, although the image 210 is compressed into the reduced image 220 and much pixel information is lost, for the pixels corresponding to the region of interest 211, the loss of pixel information is limited to the least extent, and more pixel information is retained compare to pixels in other region(s) in the image 210.

Figure 3A:
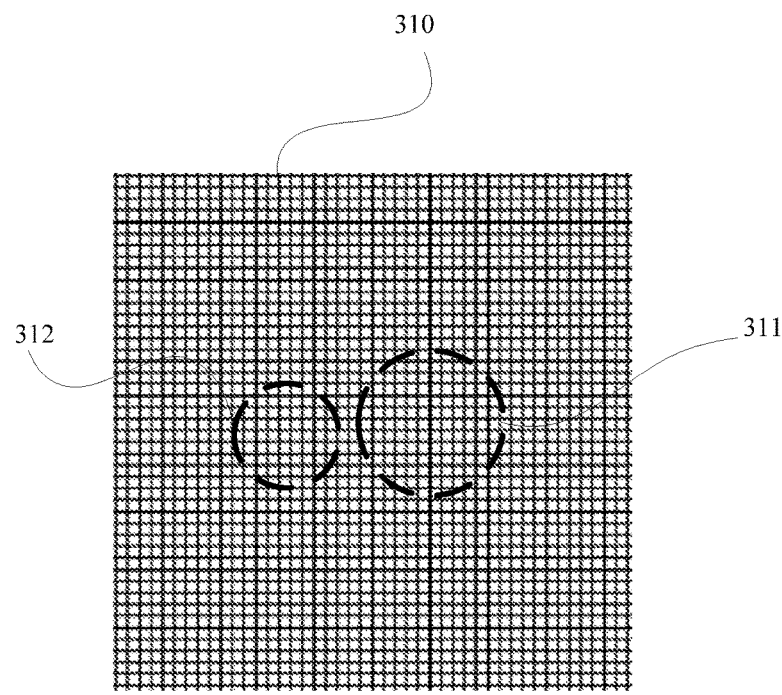
FIG. 3a to FIG. 3c are example schematic diagrams of compressing an image by using an image compression method according to an embodiment of this application.
Figure 3B:
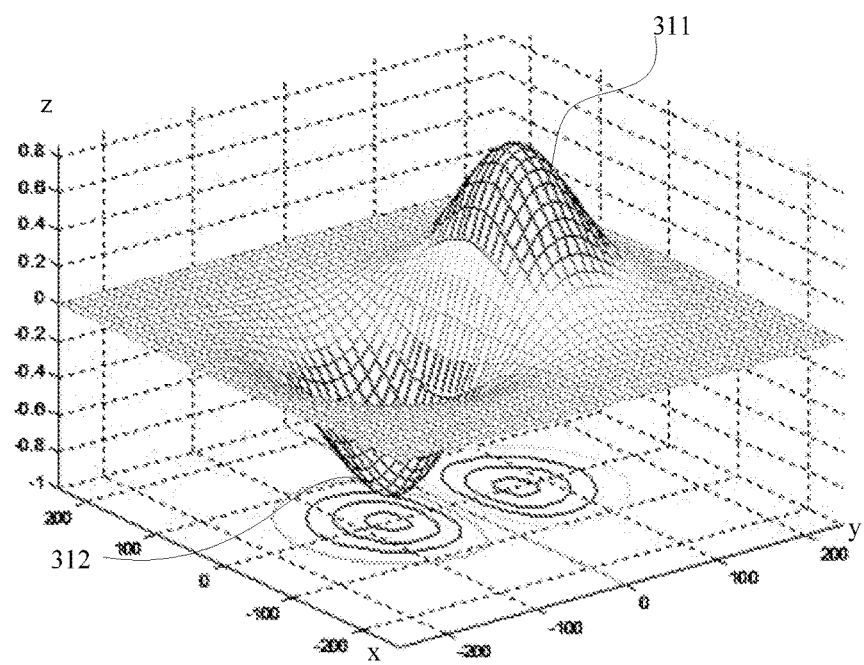
Figure 3C:
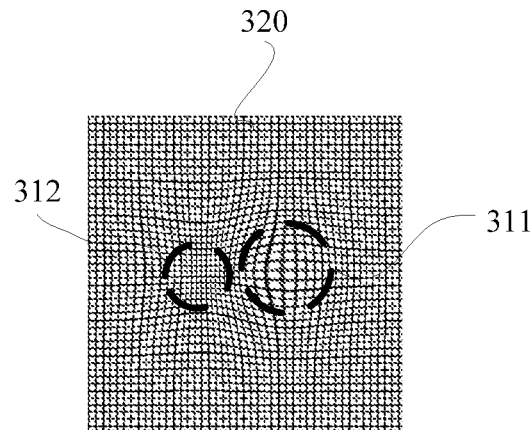

The example embodiment shown in FIG. 3a to FIG. 3c is similar to the example embodiment shown in FIG. 2a to FIG. 2c, between which the difference lies in that, an image 310 shown in FIG. 3a not only comprises a first region of interest 311 that needs to be presented for a user with high quality, but also comprises a second region of interest 312 that needs to be vaguely presented for the user.

As can be seen from FIG. 3b, when the parameter of interest of pixels in the image 310 are determined, the parameter of interest of pixels corresponding to the first region of interest 311 is the largest, the parameter of interest of pixels corresponding to the second region of interest 312 is the smallest, and the parameter of interest of pixels of other region(s) lies between the two with smooth transition.

In this example embodiment, for the pixels corresponding to the first region of interest 311, a movement trend corresponding to a first movement direction and a first movement amplitude is expanding outward, while for the pixels corresponding to the second region of interest 312, a movement trend corresponding to a first movement direction and a first movement amplitude is contracting inward.

Therefore, a reduced image 320 shown in FIG. 3c is obtained according to the parameter of interest of the pixels in the image 310 and a reduction ratio of the image 310.

As can be seen from FIG. 3c, the second region of interest 312 that needs to be vaguely presented for the user can be compressed to a larger extent; therefore, after the compression, the second region of interest 312 occupies a smaller area in the reduced image 320, and further leaves more space for the first region of interest 311 that needs to be presented for the user with high quality, to cause the first region of interest 311 to occupy a larger area after the compression.

As can be seen from above, by using the image compression method in this embodiment of this application, a region of interest that needs to be presented for a user with high quality occupies a larger area in a reduced image after compression, little pixel information is lost, and when the reduced image compressed in this way is restored, the quality of the region of interest after restoration is ensured; and for a region of interest that needs to be vaguely presented for the user, the region of interest occupies a smaller area in the reduced image after the compression, and therefore, not only vague presentation of the region of interest is implemented in the restored image, but also more space is provided for retaining an original pixel of other region(s). In addition, by using the image compression method in this embodiment of this application, the at least one region of interest is located in the same reduced image with the other region(s) after the compression, thereby facilitating processing, storage, and transmission of image information after the compression.

Figure 4:
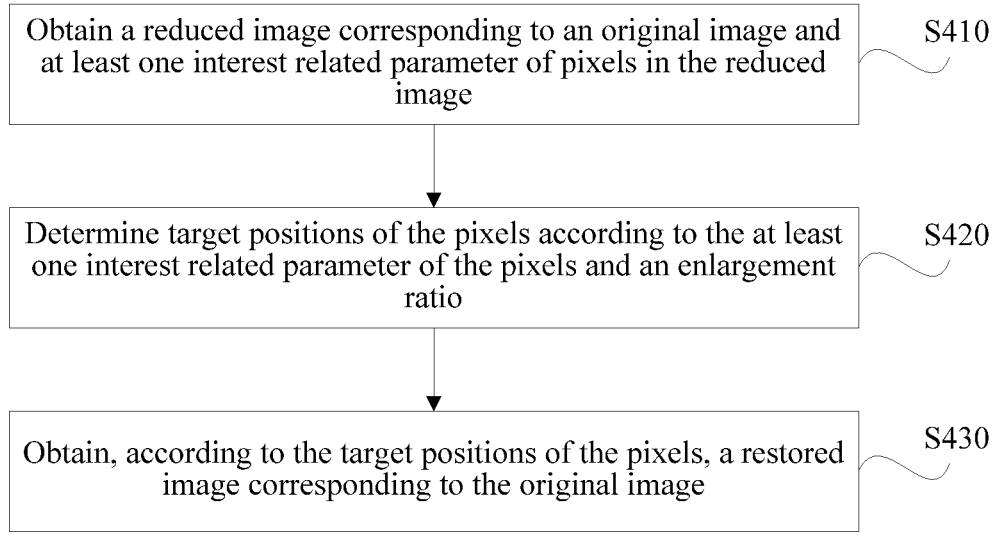
FIG. 4 is an example flowchart of steps of an image restoration method according to an embodiment of this application.

As shown in FIG. 4, an embodiment of this application provides an image restoration method, comprising:

S410: Obtain a reduced image corresponding to an original image and at least one interest related parameter of pixels in the reduced image.

S420: Determine target positions of the pixels according to the at least one interest related parameter of the pixels and an enlargement ratio.

S430: Obtain, according to the target positions of the pixels, a restored image corresponding to the original image.

In this embodiment of this application, a reduced image obtained by compressing the original image shown in FIG. 1 is restored, and is restored by using at least one interest related parameter of pixels in the reduced image, to present a restored image corresponding to a degree of interest of a user in the original image.

In this example embodiment of this application, the at least one interest related parameter of the pixels comprises:

a parameter of interest of the pixels or a second change trend parameter of the parameter of interest of the pixels.

In this example embodiment of this application, for the description of the parameter of interest of the pixels and the second change trend parameter, refer to the corresponding description in the embodiment shown in FIG. 1.

Wherein, when the at least one interest related parameter of the pixels is the parameter of interest of the pixels, step S420 further comprises:

obtaining the second change trend parameter of the parameter of interest of the pixels according to the parameter of interest of the pixels.

In an example embodiment, step S420 further comprises:

determining a first movement direction and a first movement amplitude of the pixels according to the second change trend parameter.

In this example embodiment, the second change trend parameters may also be a gradient of the parameter of interest of the pixels. On the contrary of contracting and expanding different regions in the original image according to the first change trend parameter in the embodiment shown in FIG. 1, for example, moving the pixels according to the first change trend parameter in the direction opposite to the gradient direction, in this example embodiment, pixels in the reduced image are moved according to the second change trend parameter in a gradient direction of the pixels.

In this example embodiment, step S420 further comprises:

determining a second movement direction and a second movement amplitude of the pixels according to the enlargement ratio.

In this embodiment of this application, the target positions of the pixels in the restored image can be determined according to the first and second movement directions and the first and second movement amplitudes of the pixels in the reduced image.

In an example embodiment of this embodiment of this application, the method further comprises:

obtaining the enlargement ratio.

In an example embodiment, the enlargement ratio may be obtained according to the reduction ratio in the embodiment shown in FIG. 1. For example, when the reduction ratio is ¼, the enlargement ratio is 4. Therefore, in this example embodiment, the obtaining the enlargement ratio comprises:

obtaining the reduction ratio; and obtaining the enlargement ratio according to the reduction ratio.

In another example embodiment, the enlargement ratio may be determined according to a current requirement (for example, a presentation capability of a current image presentation device).

In another example embodiment, the enlargement ratio that is a default and is locally stored may be obtained.

In this example embodiment, step S430 comprises:

obtaining the restored image according to the target positions of the pixels by performing up sampling processing.

Because the reduced image has a smaller area than the restored image, it can be known that, besides pixels existing in the reduced image, the restored image further has some blank regions, and in this example embodiment, these blank regions may be filled by performing up sampling processing.

For example, the up sampling processing may be:

for a blank point, copying a known pixel that is closest to the blank point and using the pixel as a pixel at the blank point; or performing context related interpolation processing, to obtain the pixel at the blank point.

As can be seen from this embodiment of this application, because pixel information of the at least one region of interest that needs to be presented for the user with high quality is retained as much as possible, when the image is restored, pixels obtained by performing up sampling processing mostly are pixels whose parameter of interest are not large. Therefore, in the restored image, a region corresponding to a pixel having a large parameter of interest has high image restoration quality.

A person skilled in the art may understand that, in the methods of the example embodiments of this application, sequence numbers of the steps do not mean an execution order, and the execution order of the steps should be determined according to functions and internal logic of the steps, and should not be construed as any limitation on the implementation processes of the example embodiments of this application.

Figure 5:
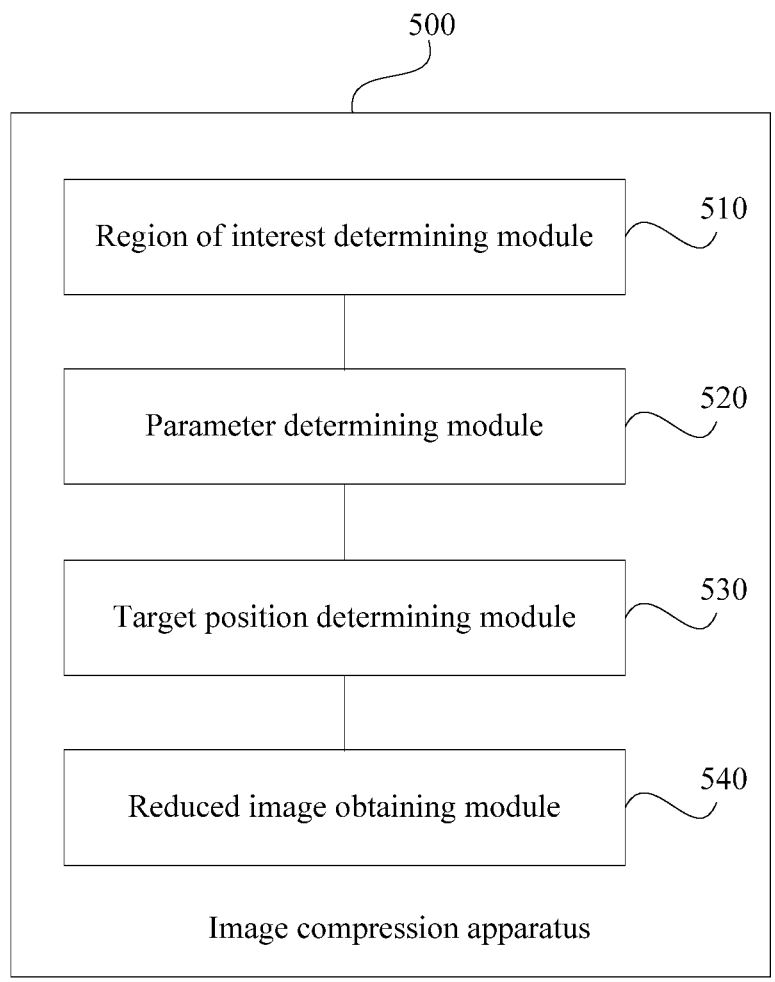
FIG. 5 is an example structural block diagram of an image compression apparatus according to an embodiment of this application.

FIG. 5 is a schematic block diagram of a structure of an image compression apparatus 500 according to an embodiment of this application. The image compression apparatus 500 comprises:

a region of interest determining module 510, configured to determine at least one region of interest in an image;

a parameter determining module 520, configured to determine a parameter of interest of pixels in the image at least according to distribution of the at least one region of interest in the image;

a target position determining module 530, configured to determine target positions of the pixels according to the parameter of interest of the pixels and a reduction ratio; and a reduced image obtaining module 540, configured to obtain, according to the target positions of the pixels, a reduced image corresponding to the image.

In this embodiment of this application, the at least one region of interest is at least one region in which a user is interested. In an example embodiment, the at least one region of interest may comprise at least one region that the user expects to present with high quality. In another example embodiment, the at least one region of interest may also comprise at least one region that the user expects to vaguely present.

The image may have one region of interest like said above, or have multiple regions of interest like said above.

In this embodiment of this application, the parameter of interest of a pixel indicates an importance degree (a degree of interest of the user) of the pixel in the image.

In this embodiment of this application, an image is compressed according to distribution of at least one region in which a user is interested in the image, and a proportion occupied by pixels of each region in a reduced image after compression is determined according to a degree of interest of the user in each region in the image.

The modules of the apparatus 500 in this embodiment of this application are further described by using the following example embodiments.

In this example embodiment, description is made by using an example in which the at least one region of interest is at least one region that a user expects to present with high quality.

In this embodiment of this application, the at least one region of interest determining module 510 may determine the at least one region of interest according to a default setting, or may determine the at least one region of interest according to a user instruction. Refer to the corresponding description in the embodiment shown in FIG. 1 for details, which are not described herein again.

In an example embodiment, the parameter determining module 520 is further configured to:

determine the parameter of interest of the pixels according to the distribution of the at least one region of interest in the image and distribution information of the pixels in the image.

In an example embodiment of this embodiment of this application, the distribution information of the pixels in the image comprises:

first position information of the pixels relative to the at least one region of interest.

In another example embodiment of this embodiment of this application, the distribution information of the pixels in the image comprises:

second position information of the pixels relative to the boundary of the image.

In another example embodiment of this embodiment of this application, the distribution information of the pixels in the image comprises: the first position information and the second position information.

For a further description of determining the parameter of interest by the parameter determining module 520, reference may be made to the corresponding description in the embodiment shown in FIG. 1.

Figure 6A:
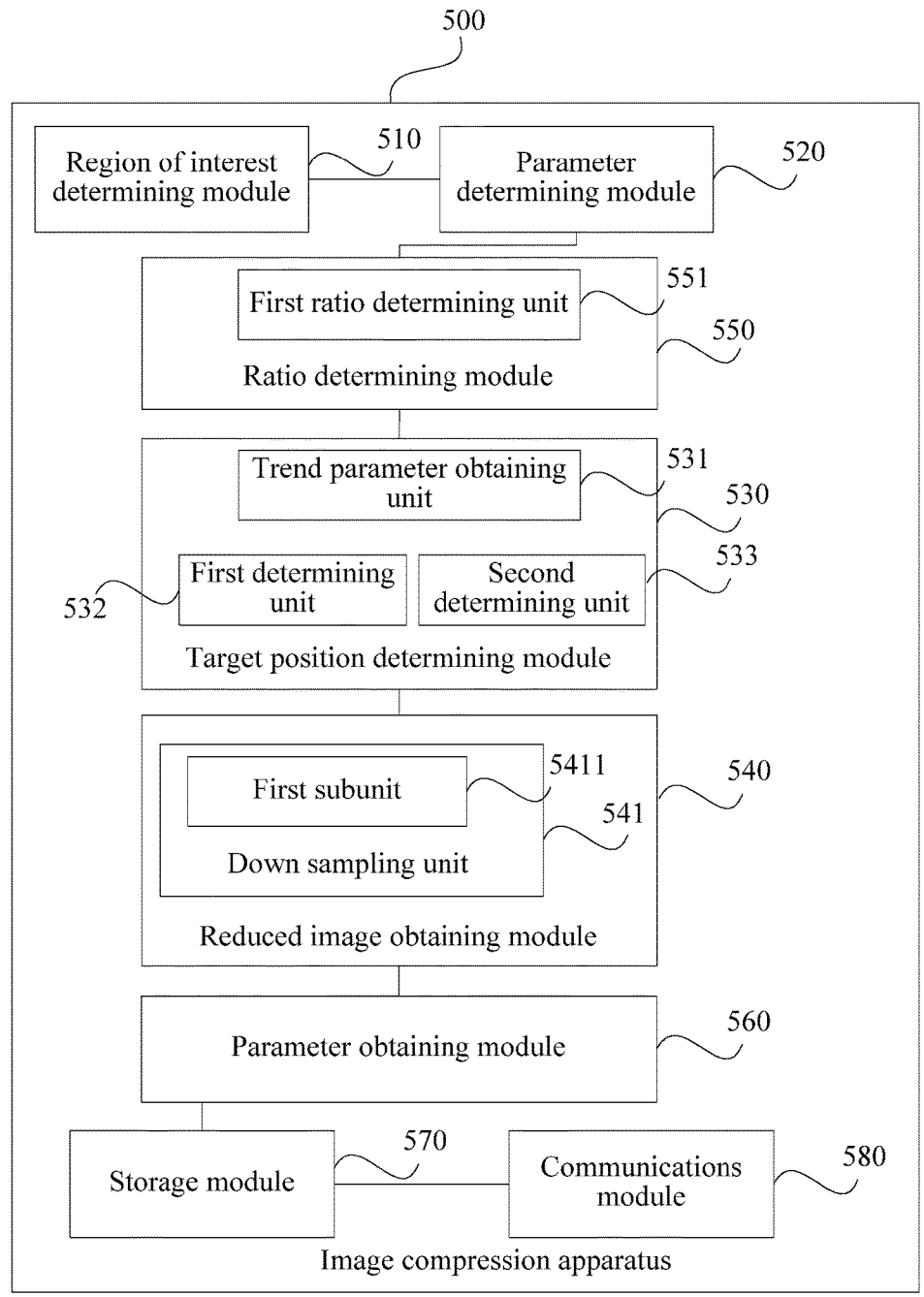
FIG. 6a and FIG. 6b are example structural block diagrams of other two image compression apparatuses according to an embodiment of this application.

As shown in FIG. 6a, in an example embodiment, the target position determining module 530 comprises:

a trend parameter obtaining unit 531, configured to obtain a first change trend parameter of the parameter of interest of the pixels according to the parameter of interest of the pixels;

a first determining unit 532, configured to determine a first movement direction and a first movement amplitude of the pixels according to the first change trend parameter; and a second determining unit 533, configured to determine a second movement direction and a second movement amplitude of the pixels according to the reduction ratio.

The target position determining module 530 can obtain a movement direction and a movement amplitude of the pixels according to the first movement direction, the first movement amplitude, the second movement direction, and the second movement amplitude of the pixels, thereby determining the target positions of the pixels.

For a further description of determining the target positions of the pixels by the target position determining module 530, reference may be made to the corresponding description in the embodiment shown in FIG. 2a to FIG. 2c, which is not described herein again.

In an example embodiment, to ensure the image quality of the at least one region of interest, the target position determining module 530 may not move pixels corresponding to the at least one region of interest, but move pixels of other region(s) towards the at least one region of interest.

In an example embodiment, the reduction ratio is a constant set value.

In another example embodiment, the reduction ratio may also be changed as required. Therefore, in this example embodiment, the apparatus 500 further comprises:

a ratio determining module 550, configured to determine the reduction ratio.

In an example embodiment, the ratio determining module 550 may comprise:

a first ratio determining unit 551, configured to determine the reduction ratio according to the distribution of the at least one region of interest in the image.

Figure 6B:
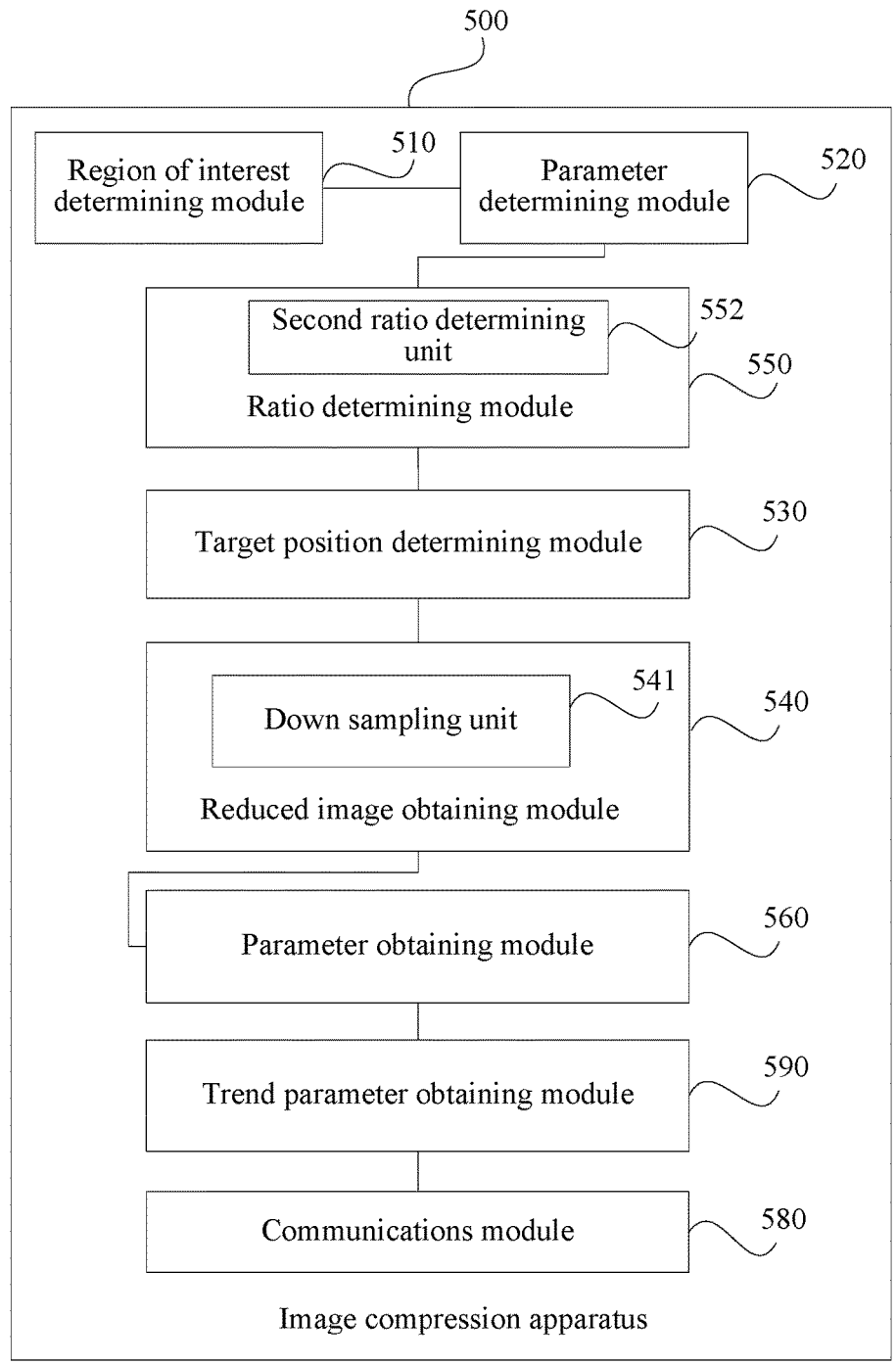

In another example embodiment, as shown in FIG. 6b, the ratio determining module 550 may comprise:

a second ratio determining unit 552, configured to determine the reduction ratio according to bandwidth of a transport network.

For a further description of separately determining the reduction ratio by the first ratio determining unit 551 and the second ratio determining unit 552, refer to the corresponding description in the embodiment shown in FIG. 1.

In this embodiment of this application, because the reduced image is an image obtained by reducing and transforming the image, it can be known that target positions of multiple pixels in the image may overlap. Therefore, in this embodiment of this application, the reduced image obtaining module 540 comprises:

a down sampling unit 541, configured to merge, by performing down sampling processing, at least two pixels that have the same target position in the image.

The merging at least two pixels can be:

determining, according to average values of pixel values and the parameter of interest of the at least two pixels, a pixel value and a value of parameter of interest of a pixel corresponding to the target position; or the merging at least two pixels can be:

determining a pixel at the target position according to weighted average values of pixel values and the parameter of interest of other pixels around the target position; or the merging at least two pixels can be:

using one pixel of the at least two pixels as a pixel at the target position.

In this embodiment of this application, a pixel having a larger parameter of interest is more important, and therefore, in an example embodiment, the down sampling unit 541 comprises:

a first subunit 5411, configured to merge the at least two pixels according to the parameter of interest of the at least two pixels.

In an example embodiment, the first subunit 5411 is further configured to:

correspondingly to that there is a pixel in the at least two pixels that has a parameter of interest larger than a parameter of interest of other pixel(s) in the at least two pixels, use the pixel having a larger parameter of interest as a pixel after merging.

The parameter of interest of the pixels in the reduced image are basis for image restoration, and therefore, the reduced image can be restored more accurately by obtaining the parameter of interest of the pixels in the reduced image. Therefore, in an example embodiment, the apparatus 500 further comprises:

a parameter obtaining module 560, configured to obtain the parameter of interest of pixels in the reduced image.

As shown in FIG. 6a, in an example embodiment, the apparatus 500 further comprises:

a storage module 570, configured to store the parameter of interest of the pixels in the reduced image; and a communications module 580, configured to output the parameter of interest of the pixels in the reduced image.

In the example embodiment shown in FIG. 6a, the storage module 570 is further configured to store the reduced image; and the communications module 580 is further configured to output the reduced image.

When the reduced image is restored, attention is paid to a change trend of the parameter of interest. Therefore, as shown in FIG. 6b, in an example embodiment, the apparatus 500 further comprises:

a trend parameter obtaining module 590, configured to obtain a second change trend parameter of the parameter of interest of the pixels in the reduced image according to the parameter of interest of the pixels in the reduced image; and the apparatus 500 further comprises:

a communications module 580, configured to output the second change trend parameter and the reduced image.

Figure 7:
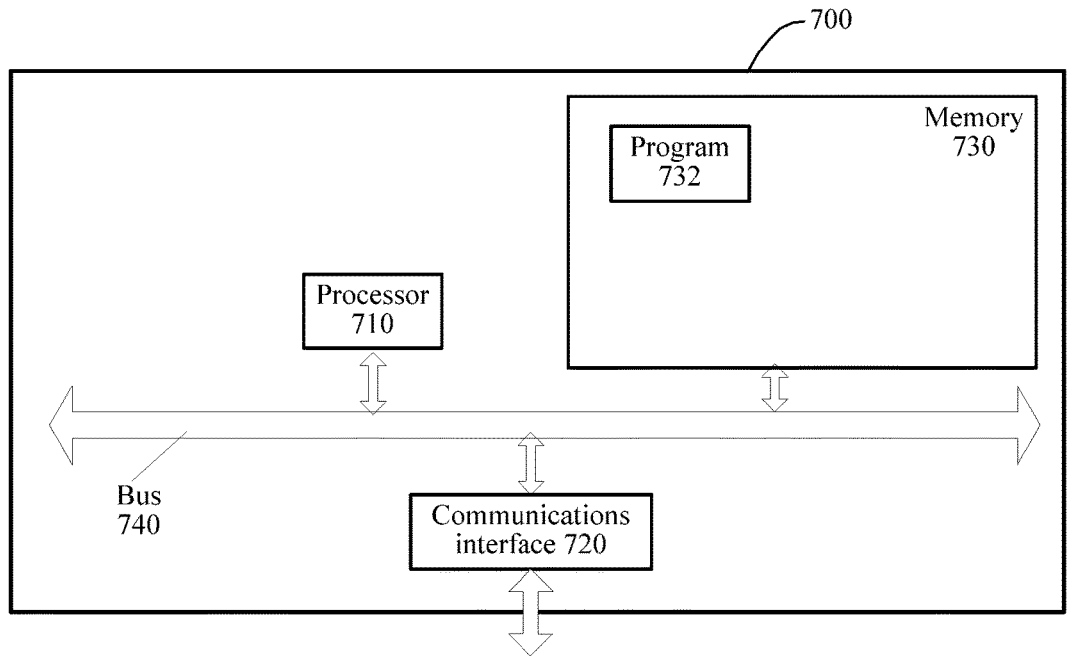
FIG. 7 is an example structural block diagram of still another image compression apparatus according to an embodiment of this application.

FIG. 7 is a schematic structural diagram of another image compression apparatus 700 according to an embodiment of this application. The specific embodiment of this application does not impose any limitation on specific implementation of the image compression apparatus 700. As shown in FIG. 7, the image compression apparatus 700 may comprise:

a processor 710, a communications interface 720, a memory 730, and a communications bus 740, wherein the processor 710, the communications interface 720, and the memory 730 communicate with each other by using the communications bus 740;

the communications interface 720 is configured to communicate with a network element such as a client; and the processor 710 is configured to execute a program 732, and specifically may execute related steps in the foregoing method embodiments.

Specifically, the program 732 may comprise program code, wherein the program code comprises a computer operation instruction.

The processor 710 may be a central processing unit (CPU), or an application specific integrated circuit (ASIC), or be configured or implemented as one or more integrated circuits in this embodiment of this application.

The memory 730 is configured to store the program 732. The memory 730 may comprise a high speed random access memory (RAM), and may further comprise a non-volatile memory, for example, at least one disk memory. The program 732 specifically may be used to instruct the image compression apparatus 700 to perform the following operations:

determining at least one region of interest in an image;

determining a parameter of interest of pixels in the image at least according to distribution of the at least one region of interest in the image;

determining target positions of the pixels according to the parameter of interest of the pixels and a reduction ratio; and obtaining, according to the target positions of the pixels, a reduced image corresponding to the image.

For the specific implementation of the steps in the program 732, reference may be made to the corresponding description of the corresponding steps and units in the foregoing embodiments, which is not described herein again. It may be clearly understood by a person skilled in the art that, for the purpose of convenient and brief description, for a detailed working process of the foregoing devices and modules, reference may be made to the corresponding process description in the foregoing method embodiments, and details are not described herein again.

Figure 8:
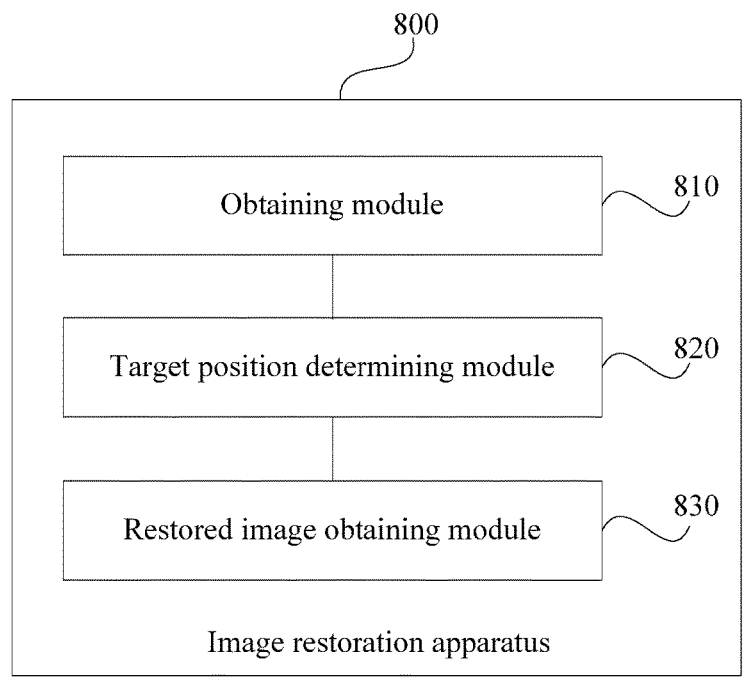
FIG. 8 is an example structural block diagram of an image restoration apparatus according to an embodiment of this application.

As shown in FIG. 8, an embodiment of this application provides an image restoration apparatus 800, comprising:

an obtaining module 810, configured to obtain a reduced image corresponding to an original image and at least one interest related parameter of pixels in the reduced image;

a target position determining module 820, configured to determine target positions of the pixels according to the at least one interest related parameter of the pixels and an enlargement ratio; and a restored image obtaining module 830, configured to obtain, according to the target positions of the pixels, a restored image corresponding to the original image.

In this embodiment of this application, a reduced image obtained by compressing the original image shown in FIG. 1 is restored, and is restored by using at least one interest related parameter of pixels in the reduced image, to present a restored image corresponding to a degree of interest of a user in the original image.

In this example embodiment of this application, the at least one interest related parameter of the pixels comprises:

a parameter of interest of the pixels or a second change trend parameter of the parameter of interest of the pixels.

In this example embodiment of this application, for the description of the parameter of interest of the pixels and the second change trend parameters, refer to the corresponding description in the embodiment shown in FIG. 1.

Figure 9:
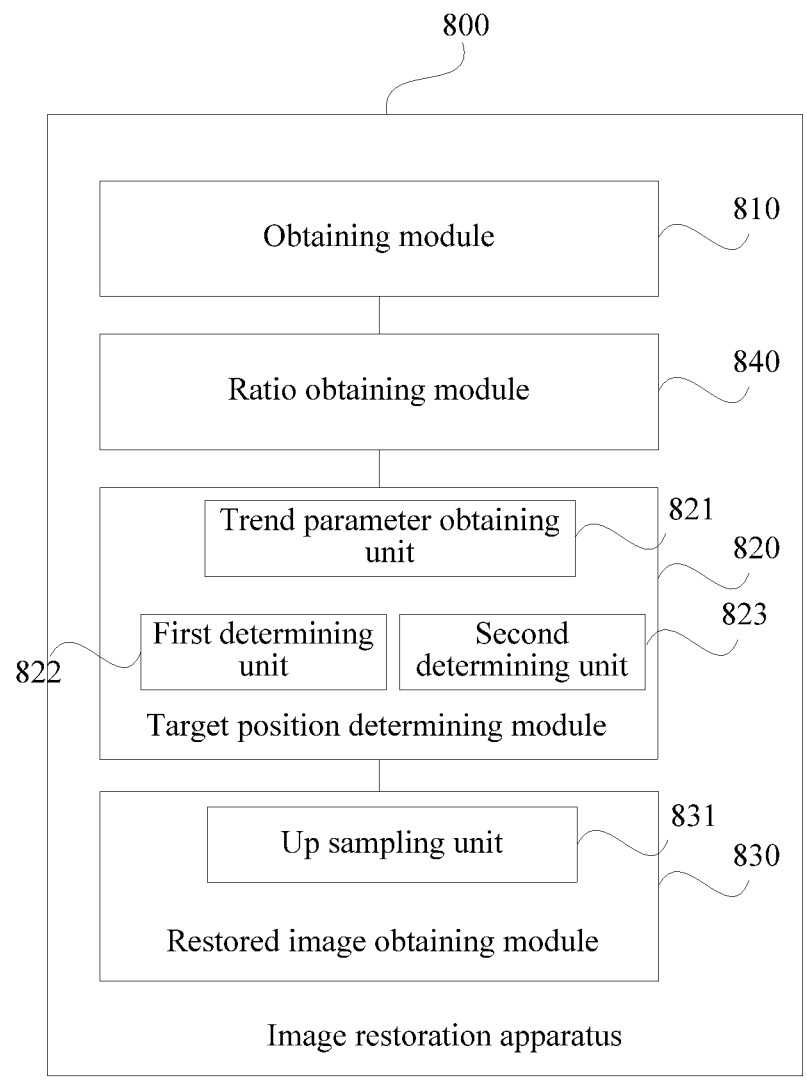
FIG. 9 is an example structural block diagram of another image restoration apparatus according to an embodiment of this application.

Wherein, when the at least one interest related parameter of the pixels comprises the parameter of interest of the pixels, as shown in FIG. 9, in an example embodiment, the target position determining module 820 comprises:

a trend parameter obtaining unit 821, configured to obtain a second change trend parameter of the parameter of interest of the pixels according to the parameter of interest of the pixels.

In an example embodiment, the target position determining module 820 comprises:

a first determining unit 822, configured to determine a first movement direction and a first movement amplitude of the pixels according to the second change trend parameter; and a second determining unit 823, configured to determine a second movement direction and a second movement amplitude of the pixels according to the enlargement ratio.

In this example embodiment, the second change trend parameter may also be a gradient of the parameter of interest of the pixels. In this example embodiment, on the contrary of contracting and expanding different regions in the original image according to the first change trend parameter in the embodiment shown in FIG. 1, for example, moving the pixels according to the first change trend parameter in the direction opposite to the gradient direction, in this example embodiment, pixels in the reduced image are moved according to the second change trend parameter in a gradient direction of the pixels.

In this embodiment of this application, the target positions of the pixels in the restored image can be determined according to the first and second movement directions and the first and second movement amplitudes of the pixels in the reduced image.

In an example embodiment, the apparatus 800 further comprises:

a ratio obtaining module 840, configured to obtain the enlargement ratio.

In an example embodiment, the ratio obtaining module 840 may obtain the enlargement ratio according to the reduction ratio in the embodiment shown in FIG. 1.

In another example embodiment, the ratio obtaining module 840 may determine the enlargement ratio according to a current requirement (for example, a presentation capability of a current image presentation device).

In another example embodiment, the ratio obtaining module 840 may obtain the enlargement ratio that is a default and is locally stored.

In the example embodiment shown in FIG. 9, the restored image obtaining module 830 comprises:

an up sampling unit 831, configured to obtain the restored image according to the target positions of the pixels by performing up sampling processing.

Because the reduced image has a smaller area than the restored image, it can be known that, besides pixels exiting in the reduced image, the restored image further has some blank regions, and in this example embodiment, these blank regions may be filled by performing up sampling processing.

For example, the up sampling processing may be:

for a blank point, copying a known pixel that is closest to the blank point and using the pixel as a pixel at the blank point; or performing context related interpolation processing, to obtain the pixel at the blank point.

As can be seen from this embodiment of this application, because pixel information of the at least one region of interest that needs to be presented for the user with high quality is retained as much as possible, when the image is restored, pixels obtained by performing up sampling processing mostly are pixels whose parameter of interest are not large. Therefore, in the restored image, a region corresponding to a pixel having a large parameter of interest has high image restoration quality.

Figure 10:
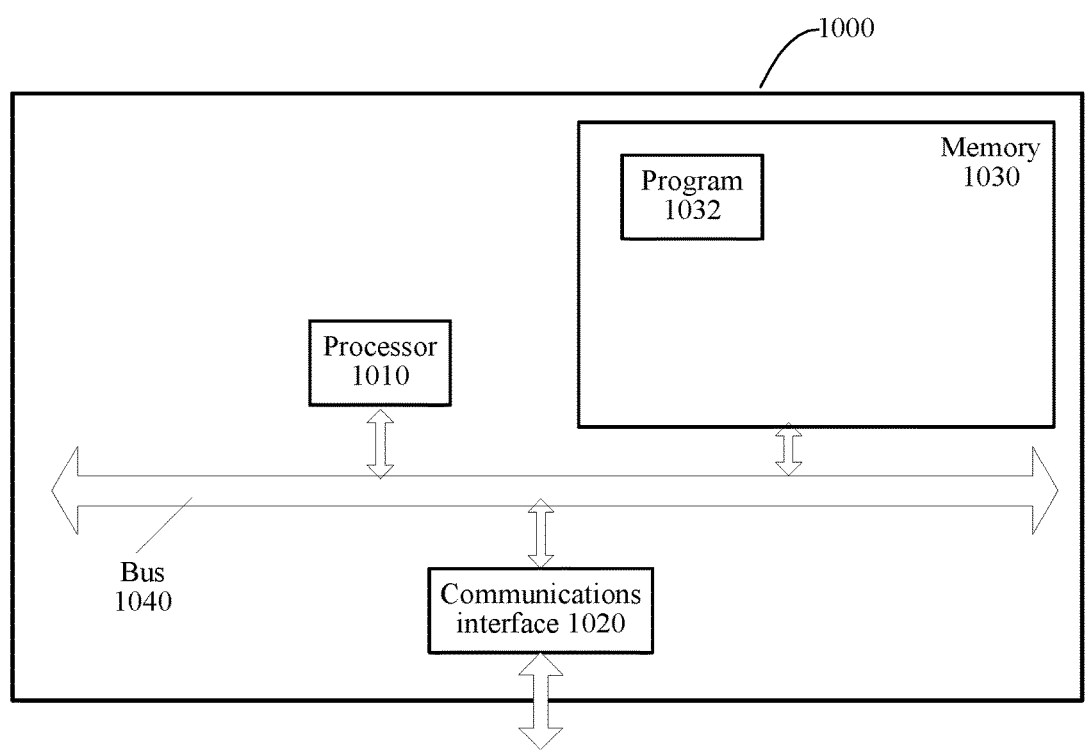
FIG. 10 is an example structural block diagram of still another image restoration apparatus according to an embodiment of this application.

FIG. 10 is a schematic structural diagram of another image restoration apparatus 1000 according to an embodiment of this application. The specific embodiment of this application does not impose any limitation on specific implementation of the image restoration apparatus 1000. As shown in FIG. 10, the image restoration apparatus 1000 may comprise:

a processor 1010, a communications interface 1020, a memory 1030, and a communications bus 1040, wherein the processor 1010, the communications interface 1020, and the memory 1030 communicate with each other by using the communications bus 1040;

the communications interface 1020 is configured to communicate with a network element such as a client; and the processor 1010 is configured to execute a program 1032, and specifically may execute related steps in the foregoing method embodiments.

Specifically, the program 1032 may comprise program code, wherein the program code comprises a computer operation instruction.

The processor 1010 may be a CPU, or an ASIC, or be configured or implemented as one or more integrated circuits in this embodiment of this application.

The memory 1030 is configured to store the program 1032. The memory 1030 may comprise a high speed RAM, and may further comprise a non-volatile memory, for example, at least one disk memory. The program 1032 specifically may be used to instruct the image restoration apparatus 1000 to perform the following steps:

obtaining a reduced image corresponding to an original image and at least one interest related parameter of pixels in the reduced image;

determining target positions of the pixels according to the at least one interest related parameter of the pixels and an enlargement ratio; and obtaining, according to the target positions of the pixels, a restored image corresponding to the original image.

For the specific implementation of the steps in the program 1032, reference may be made to the corresponding description of the corresponding steps and units in the foregoing embodiments, which is not described herein again. It may be clearly understood by a person skilled in the art that, for the purpose of convenient and brief description, for a detailed working process of the foregoing devices and modules, reference may be made to the corresponding process description in the foregoing method embodiments, and details are not described herein again.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of this application.

When the functions are implemented in a form of a software functional module and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium and comprises several instructions for instructing a computer device (which may be a personal computer, a server, a network device, or the like) to perform all or a part of the steps of the methods described in the embodiments of this application. The foregoing storage medium comprises: any medium that can store program code, such as a USB flash drive, a removable hard disk, a read-only memory (ROM), a RAM, a magnetic disk, or an optical disc.

The foregoing descriptions are merely intended to describe this application, but are not intended to limit the protection scope of this application. A person skilled in the art may make various alternations and variations without departing from the spirit and scope of this application. Therefore, all equivalent technical solutions shall also fall within the scope of this application, and the patent protection scope of this application shall be subject to the appended claims.

What is claimed is:

1. A method, comprising:
   determining, by a system comprising a processor, at least one region of interest in an image;
   determining parameters of interest for pixels within the image at least according to a distribution of the at least one region of interest in the image;
   determining target positions for the pixels according to the parameters of interest for the pixels and a reduction ratio; and
   generating, according to the target positions of the pixels, a reduced image corresponding to the image.

2. The method of claim 1, wherein the determining the parameters of interest for the pixels within the image at least according to the distribution of the at least one region of interest in the image comprises:

determining the parameters of interest for the pixels according to the distribution of the at least one region of interest in the image and distribution information of the pixels in the image.

3. The method of claim 2, wherein the distribution information of the pixels in the image comprises:
first position information of the pixels relative to the at least one region of interest.

4. The method of claim 2, wherein the distribution information of the pixels in the image comprises:
second position information of the pixels relative to the boundary of the image.

5. The method of claim 1, wherein the determining the target positions for the pixels according to the parameters of interest for the pixels and the reduction ratio comprises:
obtaining a first change trend parameter of the parameter of interest of the pixels according to the parameter of interest of the pixels.

6. The method of claim 5, wherein the determining the target positions for the pixels according to the parameters of interest for the pixels and the reduction ratio comprises:
determining a first movement direction and a first movement amplitude of the pixels according to the first change trend parameter.

7. The method of claim 6, wherein the determining the target positions for the pixels according to the parameters of interest for the pixels and the reduction ratio comprises:
determining a second movement direction and a second movement amplitude of the pixels according to the reduction ratio.

8. The method of claim 1, further comprising:
determining the reduction ratio.

9. The method of claim 8, wherein the determining the reduction ratio comprises:
determining the reduction ratio according to the distribution of the at least one region of interest in the image.

10. The method of claim 1, wherein the generating the reduced image corresponding to the image comprises:
merging, by performing down sampling processing, at least two pixels that have the same target position in the image.

11. The method of claim 10, wherein the merging the at least two pixels that have the same target position in the image comprises:
merging the at least two pixels according to the parameter of interest of the at least two pixels.

12. The method of claim 11, wherein the merging the at least two pixels according to the parameter of interest of the at least two pixels comprises:
corresponding to the parameter of interest of a pixel in the at least two pixels being determined to be larger than the parameter of interest of another pixel in the at least two pixels, using the pixel having the larger parameter of interest as a pixel after merging.

13. The method of claim 1, further comprising:
generating the parameter of interest of pixels in the reduced image.

14. The method of claim 13, further comprising:
storing or outputting the parameter of interest of the pixels in the reduced image.

15. The method of claim 13, further comprising:
generating a second change trend parameter of the parameter of interest of the pixels in the reduced image according to the parameter of interest of the pixels in the reduced image.

16. The method of claim 15, further comprising:
storing or outputting the second change trend parameter.

17. The method of claim 1, further comprising:
storing or outputting the reduced image.

18. An apparatus, comprising:
a processor, coupled to a memory, that executes or facilitates execution of executable modules, comprising:
a region of interest determining module configured to determine at least one region of interest in an image;
a parameter determining module configured to determine parameters of interest for pixels within the image at least according to distribution of the at least one region of interest in the image;
a target position determining module configured to determine target positions for the pixels according to the parameters of interest for the pixels and a reduction ratio; and
a reduced image generating module configured to obtain, according to the target positions of the pixels, a reduced image corresponding to the image.

19. The apparatus of claim 18, wherein the parameter determining module is further configured to:
determine the parameters of interest for the pixels according to the distribution of the at least one region of interest in the image and distribution information of the pixels in the image.

20. The apparatus of claim 18, wherein the target position determining module comprises:
a trend parameter generating unit configured to obtain a first change trend parameter of the parameter of interest of the pixels according to the parameter of interest of the pixels.

21. The apparatus of claim 20, wherein the target position determining module comprises:
a first determining unit configured to determine a first movement direction and a first movement amplitude of the pixels according to the first change trend parameter.

22. The apparatus of claim 21, wherein the target position determining module further comprises:
a second determining unit configured to determine a second movement direction and a second movement amplitude of the pixels according to the reduction ratio.

23. The apparatus of claim 18, wherein the executable modules further comprise:
a ratio determining module configured to determine the reduction ratio.

24. The apparatus of claim 23, wherein the ratio determining module comprises:
a first ratio determining unit configured to determine the reduction ratio according to the distribution of the at least one region of interest in the image.

25. The apparatus of claim 18, wherein the reduced image obtaining module comprises:
a down sampling unit configured to merge, by performing down sampling processing, at least two pixels that have the same target position in the image.

26. The apparatus of claim 25, wherein the down sampling unit comprises:
a first subunit configured to merge the at least two pixels according to the parameter of interest of the at least two pixels.

27. The apparatus of claim 26, wherein the first subunit is further configured to:
in response to the parameter of interest of a pixel in the at least two pixels being determined to be larger than the parameter of interest of other pixels in the at least two pixels, using the pixel as the pixel after merging.

28. The apparatus of claim 18, wherein the executable modules further comprise:

a parameter obtaining module configured to generate parameters of interest for pixels within the reduced image.

29. The apparatus of claim 28, wherein the executable modules further comprise:
a storage module configured to store the parameter of interest of the pixels in the reduced image; or
a communications module, configured to output the parameter of interest of the pixels in the reduced image.

30. The apparatus of claim 28, wherein the executable modules further comprise:
a trend parameter generating module configured to obtain a second change trend parameter of the parameter of interest of the pixels in the reduced image according to the parameter of interest of the pixels in the reduced image.

31. The apparatus of claim 30, wherein the executable modules further comprise:
a storage module configured to store the second change trend parameter; or
a communications module configured to output the second change trend parameter.

32. The apparatus of claim 18, wherein the executable modules further comprise:
a storage module configured to store the reduced image; or
a communications module configured to output the reduced image.

33. A computer readable storage device comprising executable instructions that, in response to execution, cause a device comprising a processor to perform operations, comprising:
determining a region of interest in an image;
determining parameters of interest for pixels within the image at least according to distribution of the region of interest in the image;
determining target positions for the pixels according to the parameters of interest for the pixels and a reduction ratio; and
generating, according to the target positions of the pixels, a reduced image corresponding to the image.

* * * * *